US012090932B1

(12) United States Patent
Johnston et al.

(10) Patent No.: US 12,090,932 B1
(45) Date of Patent: Sep. 17, 2024

(54) VEHICLE GRAB HANDLE WITH INTEGRAL HANDWASH/EYE WASH FIXTURES

(71) Applicants: Barry Johnston, Tipton, CA (US); Rusty Don Soward, Lindsay, CA (US)

(72) Inventors: Barry Johnston, Tipton, CA (US); Rusty Don Soward, Lindsay, CA (US)

( * ) Notice: Subject to any disclaimer, the term of this patent is extended or adjusted under 35 U.S.C. 154(b) by 246 days.

(21) Appl. No.: 17/940,393

(22) Filed: Sep. 8, 2022

(51) Int. Cl.
*B60R 15/02* (2006.01)
*A61H 35/02* (2006.01)

(52) U.S. Cl.
CPC ............. *B60R 15/02* (2013.01); *A61H 35/02* (2013.01); *A61H 2201/0107* (2013.01); *A61H 2201/0119* (2013.01)

(58) Field of Classification Search
CPC .......... B67D 7/78; B67D 2210/00128; B60R 15/02; A61H 35/02; E03C 1/0409; E04H 4/14; A47K 3/28; A47K 3/281; A47K 3/286
See application file for complete search history.

(56) References Cited

U.S. PATENT DOCUMENTS

| 3,121,235 | A | * | 2/1964 | Gellmann | A47K 3/285 4/570 |
| 4,627,845 | A | * | 12/1986 | DeMotte | A61H 35/02 239/587.5 |
| 5,503,597 | A | * | 4/1996 | Lochtefeld | A63G 3/02 472/117 |
| 5,530,972 | A | * | 7/1996 | Tanner | A61H 35/02 4/620 |
| 2022/0061593 | A1 | * | 3/2022 | Milian | A47K 10/08 |

FOREIGN PATENT DOCUMENTS

| DE | 102007011520 A1 * | 10/2008 | ............. B60R 11/00 |
| WO | WO-2008025338 A1 * | 3/2008 | ............. B60J 5/101 |

* cited by examiner

*Primary Examiner* — Erin Deery
(74) *Attorney, Agent, or Firm* — Scanlon Duncan LLP; James M. Duncan (57) ABSTRACT

A grab handle has a U-shaped hollow body. The U-shaped body has a water dispensing section which is configured to dispense a flow of water from an interior of the U-shaped body where the flow of water may be used, among other uses, as a hand wash station, an eye wash station, or for providing water for utilitarian purposes. The grab handle may be attached to a panel of a vehicle and also function to provide assistance to a person to climb up or onto the vehicle. The water dispensing section may have a slot, a plurality of nozzles, an outlet with a fixture, or any combination of the same.

12 Claims, 7 Drawing Sheets

VEHICLE GRAB HANDLE WITH INTEGRAL HANDWASH/EYE WASH FIXTURES

BACKGROUND OF THE INVENTION

It is frequently necessary to have hand wash stations and/or eye wash stations brought to the site of job or project because such facilities are either unavailable or inconveniently located. A common practice is to tow a trailer to the job site, where the trailer is equipped with the hand wash and/or eye wash station. However, this practice requires a dedicated vehicle to tow the trailer to the job site. In some cases, workers may be called to a job site before a wash trailer can be transported to the job site. In other cases, the size of a job may suggest that a wash trailer is not required, or the job location is impractical to transport and/or park a wash trailer.

Many work trucks used at job sites are utility trucks. Such trucks may have grab handles attached to an exterior of the rear end of the truck, with the grab handles located in positions which provide a handhold to assist a worker to step up onto the bumper or to climb up into the bed of the truck.

SUMMARY OF THE INVENTION

Embodiments of the present invention provide a grab handle which dispenses water through the body of the grab handle, where the water may be used for washing hands or for flushing a person's eyes. The grab handle may be attached to a rear panel of a vehicle, such as a utility truck, such that the grab handle serves to provide a handhold to assist a person to climb into the back of the vehicle.

An embodiment of the grab handle has a U-shaped hollow body having a first end. An attachment flange is attached to the first end, where the attachment flange has a first face which is configured to be attached to a panel of the vehicle. The first face has an opening which is configured to receive a flow of water from the vehicle. The grab handle has a water dispensing section configured to dispense the flow of water from an interior of the U-shaped body to an exterior of the U-shaped body. The U-shaped hollow body has a second end. An attachment flange is attached to the second end, with the attachment flange having a face which is configured to attach to the panel of the vehicle.

The water dispensing section may have several different configurations which may be utilized for washing hands, flushing eyes, or a configuration which is configured for a user to selectively wash the user's hands or flush the user's eyes. The water dispensing section may have a slot which extends down a portion of the handle, either on the top of the handle or the underside. Alternatively, the water dispensing section may comprise a plurality of nozzle members configured to dispense the flow of water. Alternatively, the water dispensing section may comprise an eye wash figure configured to dispense the flow of water.

In one embodiment the grab handle may comprise a first conduit member and a second conduit member. The first conduit member may be connected to a first outlet configured to dispense a first flow of water provided through the first conduit member. The second conduit member may be connected to a second outlet configured to dispense a second flow of water provided through the second conduit member. In this embodiment, the grab handle may independently function as a handwash station and as an eye wash station. The first flow of water may be activated by a first activation mechanism and the second flow of water may be activated by a second activation mechanism. For example, each activation mechanism may be a button which activates a pump disposed within the vehicle, where the pump receives water from a tank.

DETAILED DESCRIPTION OF THE INVENTION

Figure 1:
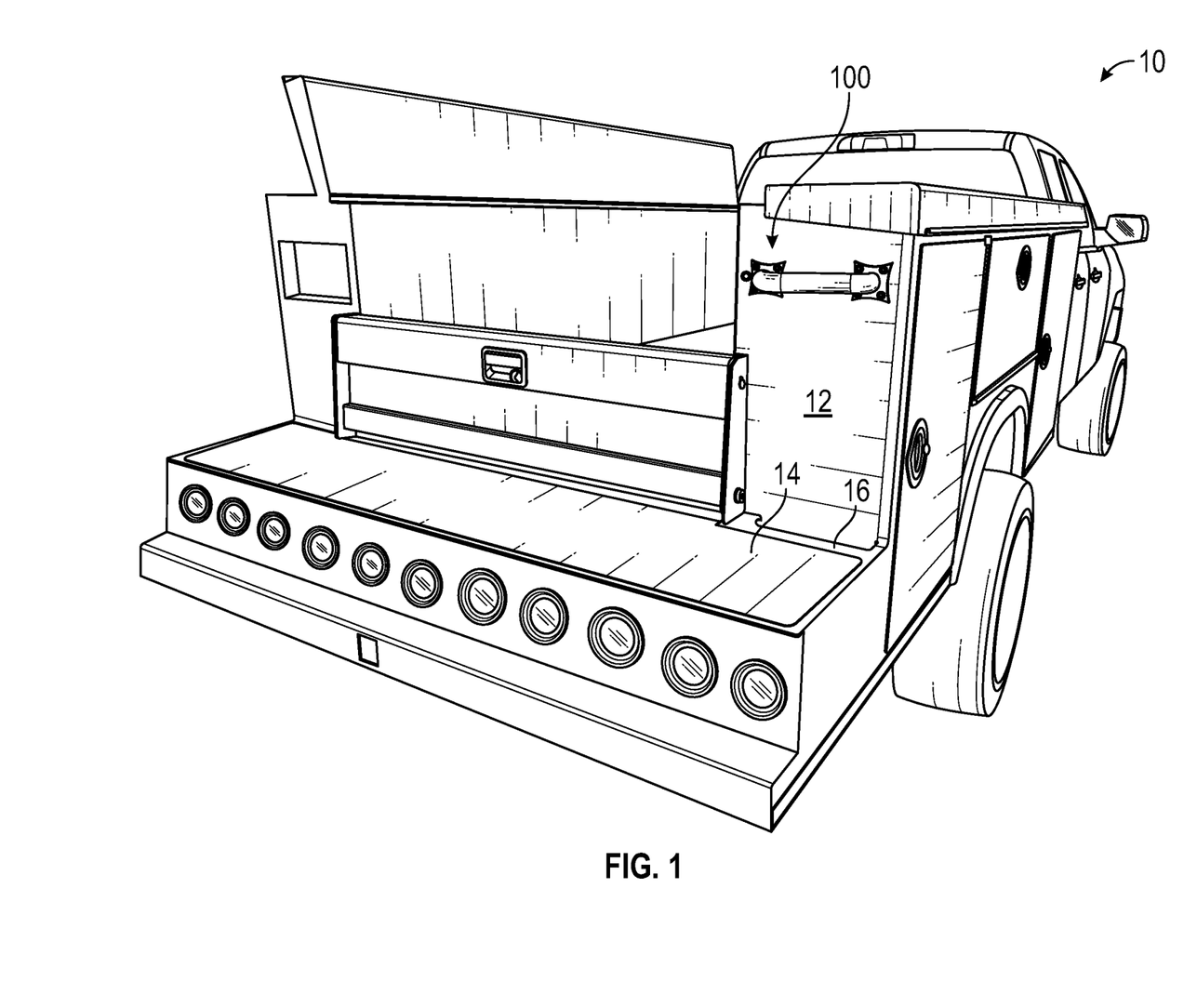
FIG. 1 depicts an embodiment of the grab handle attached to the rear of a vehicle.

Referring now to the figures, FIG. 1 shows a utility truck 10 having an embodiment of the disclosed water dispensing grab handle 100 attached to panel 12 at the rear of the utility truck. As shown in FIG. 1, water dispensing grab handle 100 is conveniently located to provide a handhold to assist a person to climb unto the bumper 14 of the truck 10 and into the back of the truck if desired. Utility truck 10 may be equipped with a drain 16 placed below the water dispensing grab handle 100 which routes the dispensed water through the drain 16 to the underside of the utility truck 10.

Figure 2:
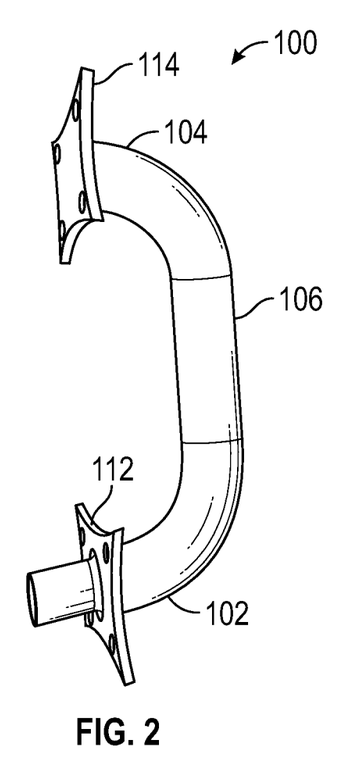
FIG. 2 shows a top view of an embodiment of the grab handle.
Figure 3:
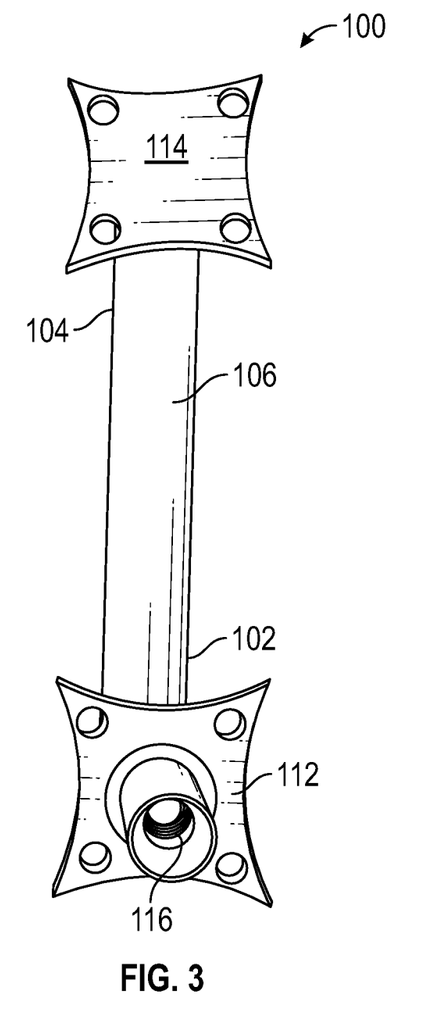
FIG. 3 shows a back view of an embodiment of the grab handle.

It is to be noted that FIGS. 1-3 shows a generic water dispensing grab handle 100 without any reference to a specific water dispensing structure. The generic water dispensing grab handle 100 has a first end 102, a second end 104, and a water dispensing section 106. Water dispensing grab handle 100 has a first attachment flange 112 attached to first end 102 and a second attachment flange 114 attached to second end 104. First attachment flange 112 may have a threaded inlet 116.

Figure 4:
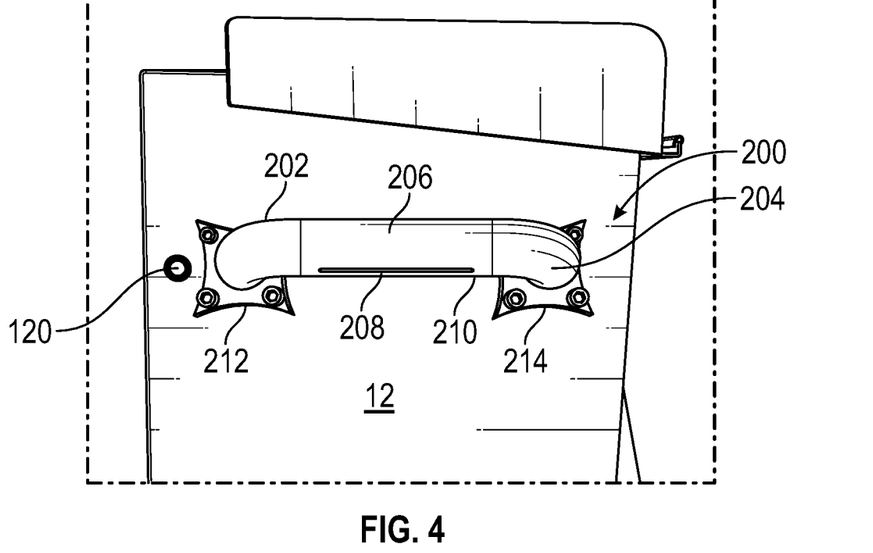
FIG. 4 depicts an embodiment of the grab handle having a downward facing water dispensing slot.

FIG. 4 shows a close-up view of water dispensing grab handle 200 attached to panel 12. As shown in FIG. 4, water dispensing grab handle 200 has a first end 202, a second end 204, and a water dispensing section 206. The embodiment of the water dispensing grab handle 200 shown in FIG. 4 has an elongated slot 208 disposed on the bottom side 210 of the grab handle. Water dispensing grab handle 200 has a first attachment flange 212 attached to first end 202 and a second attachment flange 214 attached to second end 204. It is to be appreciated that in addition to elongated slot 208, other water dispensing structures may be utilized at the bottom side 210 of the water dispensing grab handle, such as a plurality of nozzles, single outlet, and like structures.

Figure 10:
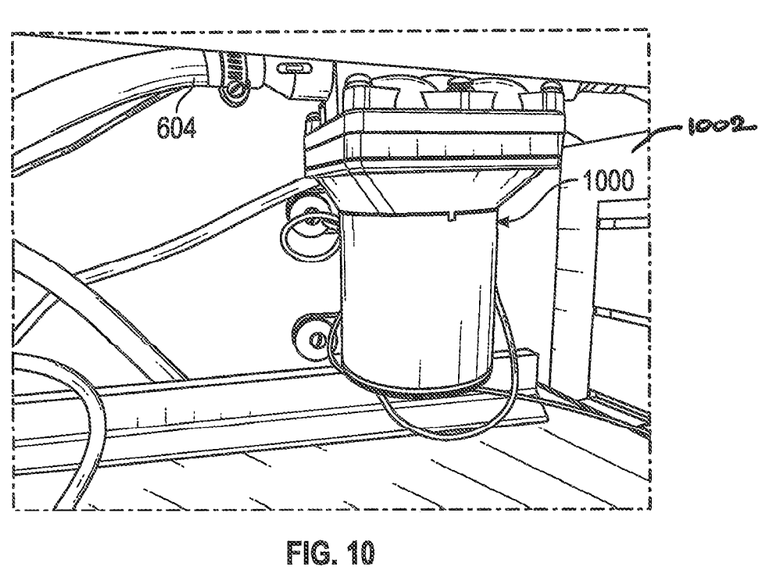
FIG. 10 shows an embodiment of a pump which may be utilized to provide a flow of water to embodiments of the disclosed grab handle.

FIG. 4 also shows an activation button 120 which may be used to actuate a pump unit 1000, such as that depicted in FIG. 10. It is to be appreciated that in addition to a system in which the grab handle 200 receives a flow of water by a pump or other apparatus which provides pressurized flow (e.g., pressure tank) a gravitational system may also be utilized to provide flow to the grab handle 200. In such embodiments, a manual valve may be utilized to allow a gravity flow of water into water dispensing grab handle 100, 200, and other embodiments in which the device is utilized for hand washing. However, a pressurized water source is preferred for embodiments of the device used as an eye wash station. As indicated by the presence of elongated slot 208 on the bottom side 210 of the grab handle, water dispensing grab handle 200 is generally configured for use as a hand washing device, for washing other items, or for dispensing water (or other liquid) as desired.

Figure 5:
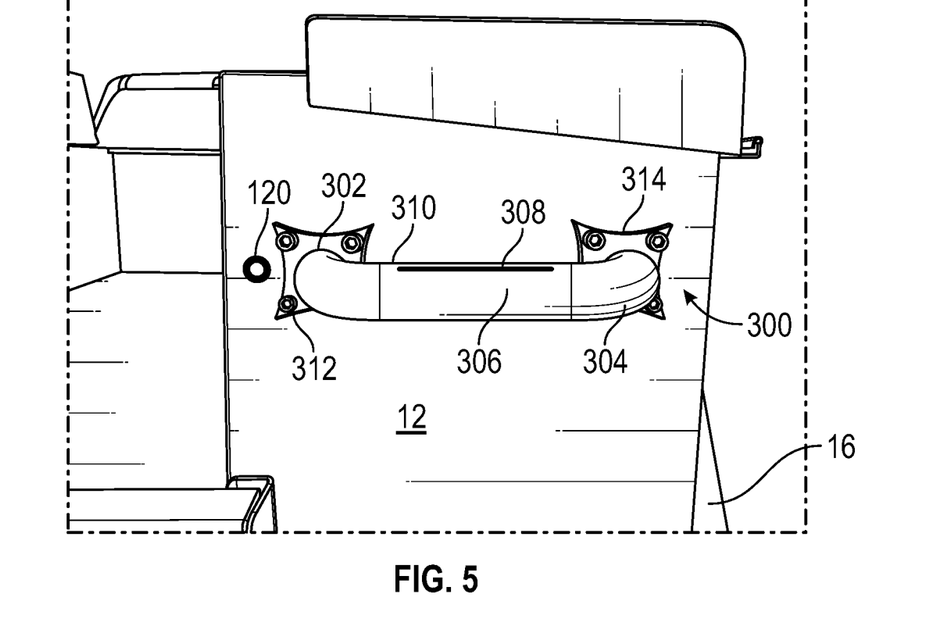
FIG. 5 depicts an embodiment of the grab handle having an upward facing water dispensing slot.

FIG. 5 shows a close-up view of an embodiment of water dispensing grab handle 300 attached to panel 12. As shown in FIG. 5, water dispensing grab handle 300 has a first end 302, a second end 304, and a water dispensing section 306. The embodiment of the water dispensing grab handle 300 shown in FIG. 5 has an elongated slot 308 disposed on the top side 310 of the grab handle. Water dispensing grab handle 300 has a first attachment flange 312 attached to first end 302 and a second attachment flange 314 attached to second end 304. As indicated by the presence of elongated slot 308 on the top side 310 of the grab handle, water dispensing grab handle 300 is generally configured for use as an eye flushing device.

Figure 8:
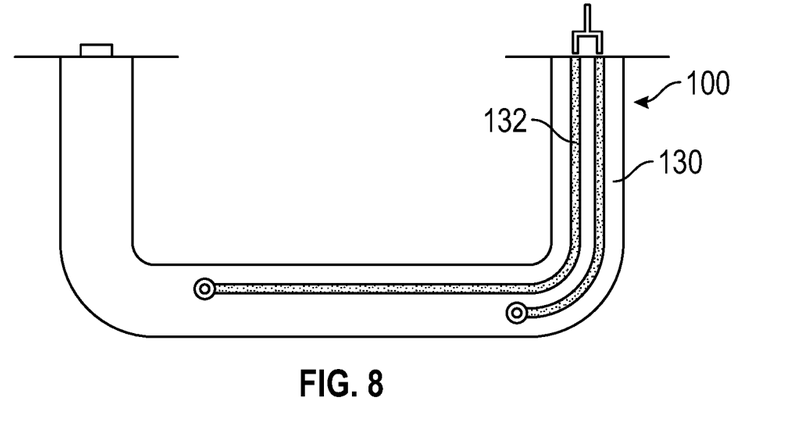
FIG. 8 schematically shows a configuration of internal conduits which may be disposed within an embodiment of the grab handle.

It should also be appreciated that an embodiment of the grab handle may have an elongated slot 208 on the bottom side 210 of the grab handle and also have an elongated slot 308 on the top side 310 of the grab handle, thereby providing a device which can function as both a hand wash station as well as an eye flush station. Such an embodiment may use dedicated internal conduits 130, 132 as schematically shown in FIG. 8, with one conduit directed to elongated slot 208 and the other conduit directed to elongated slot 308, with each conduit supplying water to a housing (not shown) enclosing each of the elongated slots to contain the flow of water to each elongated slot. Such embodiment may utilize two separate activation buttons 120 for independently providing water to the water dispensing structure on the top side and bottom side of the grab handle.

Figure 6:
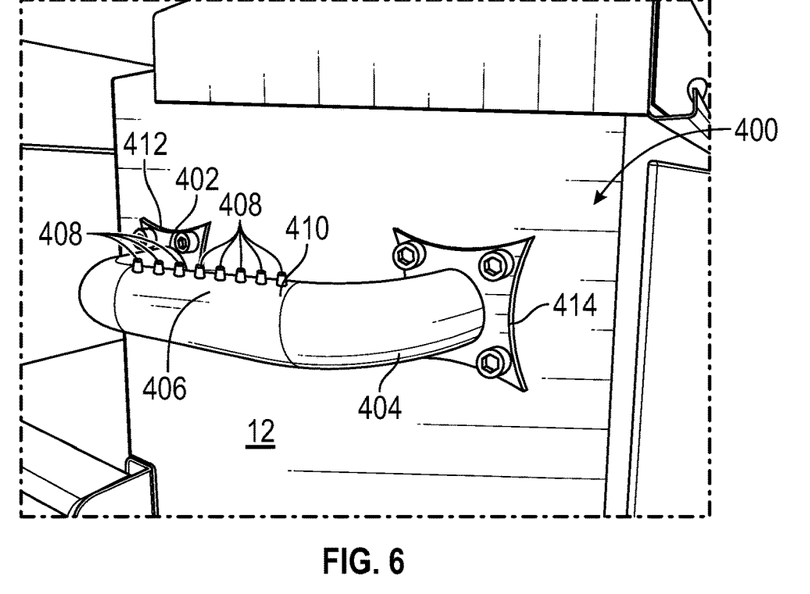
FIG. 6 depicts an embodiment of the grab handle having upward facing water dispensing nozzles.

FIG. 6 shows a close-up view of an embodiment of water dispensing grab handle 400 attached to panel 12. As shown in FIG. 6, water dispensing grab handle 400 has a first end 402, a second end 404, and a water dispensing section 406. The embodiment of the water dispensing grab handle 400 shown in FIG. 6 has a plurality of nozzles 408 disposed on the top side 410 of the grab handle. Water dispensing grab handle 400 has a first attachment flange 412 attached to first end 402 and a second attachment flange 414 attached to second end 404. As indicated by the presence of plurality of nozzles 408 on the top side 410 of the grab handle, water dispensing grab handle 400 is generally configured for use as an eye flushing device.

It should also be appreciated that an embodiment of the grab handle may have a plurality of nozzles on the bottom side of the grab handle while also having a plurality of nozzles 408 on the top side 410, thereby providing a device which can function as both a hand wash station as well as an eye flush station. Such an embodiment may use dedicated internal conduits 130, 132 as schematically shown in FIG. 8, with one conduit directed to set of nozzles 408 and the other conduit directed to a set of nozzles on the bottom side of the grab handle, with each conduit supplying water to a housing (not shown) enclosing each set of nozzles. Such embodiment may utilize separate activation buttons 120 for independently providing water to the water dispensing structure on the top side and bottom side of the grab handle.

It is also to be appreciated that an embodiment of the grab handle may have a plurality of nozzles 408 on the top side 410 and also have an elongated slot on the bottom side of the grab handle, or vice versa.

Figure 7:
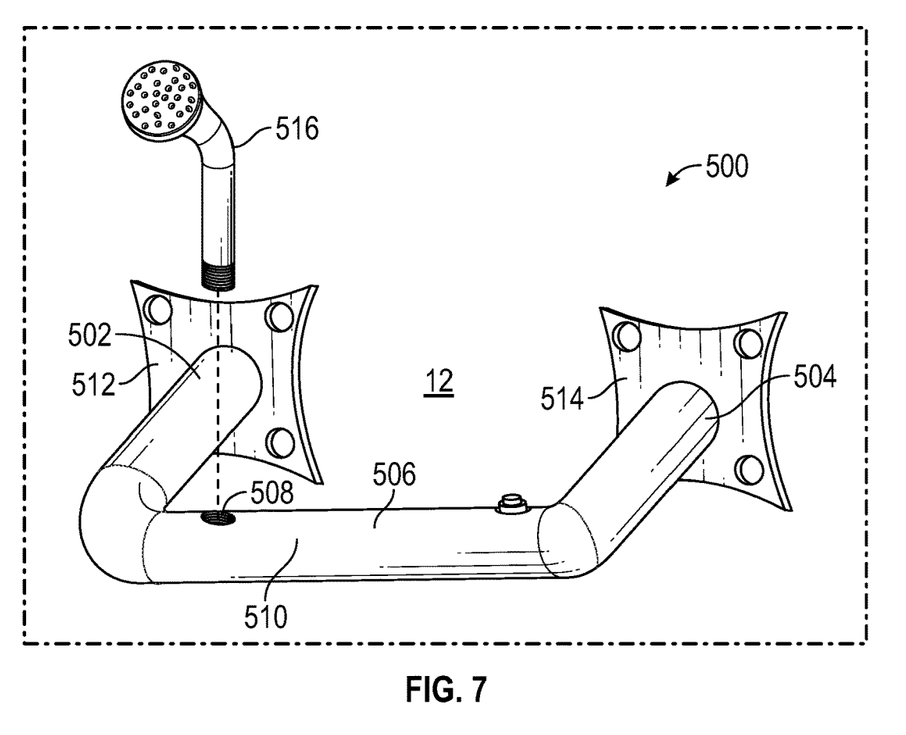
FIG. 7 depicts an embodiment of the grab handle having a nozzle fixture attached to an upward facing outlet.

FIG. 7 shows a close-up view of an embodiment of water dispensing grab handle 500 attached to panel 12. As shown in FIG. 7, water dispensing grab handle 500 has a first end 502, a second end 504, and a water dispensing section 506. The embodiment of the water dispensing grab handle 500 shown in FIG. 7 may have an outlet 508 disposed on the top side 510 of the grab handle. Water dispensing grab handle 500 has a first attachment flange 512 attached to first end 502 and a second attachment flange 514 attached to second end 504. An eye wash fixture 516 may be connected to outlet 508. Other fixtures, such as a flexible hose may be connected to outlet 508.

Figure 9:
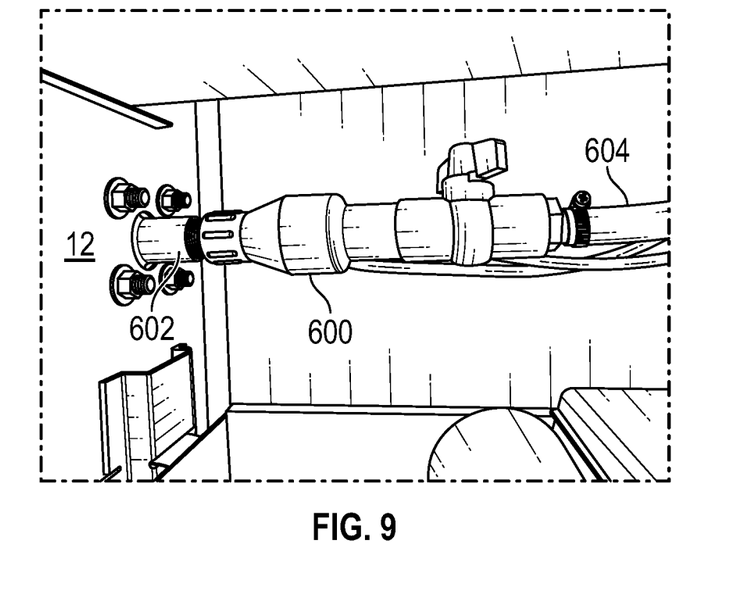
FIG. 9 shows an embodiment of a valve and conduit combination which may be connected to embodiments of the grab handle on the opposite side of a mounting panel.

FIG. 9 shows a conduit 600 which has a first end 602 attaches to any one of the embodiments of water dispensing grab handles 100, 200, 300, 400, 500 on the backside of panel 12. The other end 604 which attaches to pump 1000 unit as shown in FIG. 10. Pump 1000 may have an inlet attached to a water reservoir 1002 maintained on the vehicle 10.

Having thus described the preferred embodiment of the invention, what is claimed as new and desired to be protected by Letters Patent includes the following:

The invention claimed is:

1. A grab handle comprising:
   a U-shaped hollow body having a first end, a second end, and a water dispensing section disposed between the first end and the second end, the water dispensing section configured to dispense a flow of water from an interior of the U-shaped body to an exterior of the U-shaped body;
   a first attachment flange attached to the first end, the first attachment flange comprising a first face configured to attach to a panel, the first face comprising an opening configured to receive an incoming flow of water from a water source;
   a second attachment flange attached to the second end, the second attachment flange comprising a second face configured to attach to the panel; and
   a first conduit member and a second conduit member disposed within the U-shaped hollow body, wherein the first conduit member is connected to a first outlet in the water dispensing section and the second conduit member is connected to a second outlet in the water dispensing section.

2. The grab handle of claim 1 wherein the water dispensing section comprises an elongated slot which extends through a wall of the U-shaped hollow body.

3. The grab handle of claim 2 wherein the elongated slot is disposed within a top side of the U-shaped body.

4. The grab handle of claim 2 wherein the elongated slot is disposed within a bottom side of the U-shaped body.

5. The grab handle of claim 1 wherein the water dispensing section comprises a plurality of nozzle members configured to dispense the flow of water.

6. The grab handle of claim 1 wherein the water dispensing section comprises an eye wash fixture configured to dispense the flow of water.

7. A water dispensing system configured to dispense hand wash water and/or eye flush water from a vehicle comprises:
- a water reservoir disposed on the vehicle;
- a pump disposed on the vehicle, the pump connected to the water reservoir;
- a conduit member configured to receive a flow of water from the pump, the conduit member having an outlet end;
- a grab handle comprising a U-shaped hollow body having a first end, a second end, and a water dispensing section disposed between the first end and the second end, the first end connected to the outlet end of the conduit member, wherein the water dispensing section is configured to dispense at least a portion of the flow of the water received from the conduit member;
- a first attachment flange attached to the first end, the first attachment flange comprising a first face configured to attach to the panel; and
- a second attachment flange attached to the second end, the second attachment flange comprising a second face configured to attach to the panel.

8. The water dispensing system of claim 7 wherein the water dispensing section comprises an elongated slot which extends through a wall of the U-shaped hollow body.

9. The water dispensing system of claim 8 wherein the elongated slot is disposed within a top side of the U-shaped body.

10. The water dispensing system of claim 8 wherein the elongated slot is disposed within a bottom side of the U-shaped body.

11. The water dispensing system of claim 7 wherein the water dispensing section comprises a plurality of nozzle members configured to dispense the flow of water.

12. The water dispensing system of claim 7, wherein the water dispensing section comprises an eye wash fixture configured to dispense the flow of water.

* * * * *